United States Patent [19]

O'Malley

[11] 3,730,022

[45] May 1, 1973

[54] POWER TRANSMISSION

[75] Inventor: John J. O'Malley, Livonia, Mich.

[73] Assignee: General Motors Corporation, Detroit, Mich.

[22] Filed: Mar. 7, 1969

[21] Appl. No.: 805,190

[52] U.S. Cl. ................................................. 74/759
[51] Int. Cl. ............................................. F16h 57/10
[58] Field of Search ........................ 74/761, 763, 759

[56] References Cited

UNITED STATES PATENTS

| | | | |
|---|---|---|---|
| 1,256,373 | 2/1918 | Rowledge | 74/761 |
| 2,651,950 | 9/1953 | Schou | 74/759 |
| 2,856,794 | 10/1958 | Simpson | 74/763 |
| 3,023,640 | 3/1962 | Schou | 74/761 X |
| 3,071,985 | 1/1963 | Wickman | 74/761 |
| 3,095,764 | 7/1963 | Peras | 74/763 |
| 3,147,643 | 9/1964 | Christenson et al. | 74/759 |
| 3,188,885 | 6/1965 | Fisher | 74/761 X |
| 3,319,491 | 5/1967 | Simpson | 74/759 X |
| 3,587,347 | 6/1971 | Hanzi et al. | 74/759 |

*Primary Examiner*—Charles J. Myhre
*Assistant Examiner*—Thomas C. Perry
*Attorney*—E. W. Christen, A. M. Heiter and D. F. Scherer

[57] ABSTRACT

This disclosure relates to a transmission providing four forward drive ratios, neutral and reverse wherein all changes of forward drive ratio other than changes to direct drive are accomplished simply by release of one brake and application of a second brake. Three planetary gear units and two brakes are located in the housing rearwardly of a support web and two clutches and one brake are located forwardly of the support web. Change of ratio to direct drive is accomplished by release of a brake and engagement of a clutch. All clutches and brakes are of the disc type to eliminate the need for band adjustment. In the gearing, the planet carriers of two of the gear units and ring gear of one unit are fixed for rotation as a unit with the output shaft, the sun gears of two units are fixed to each other, and the sun gear of one unit and ring gear of another unit are fixed to each other.

8 Claims, 1 Drawing Figure

Patented May 1, 1973 3,730,022
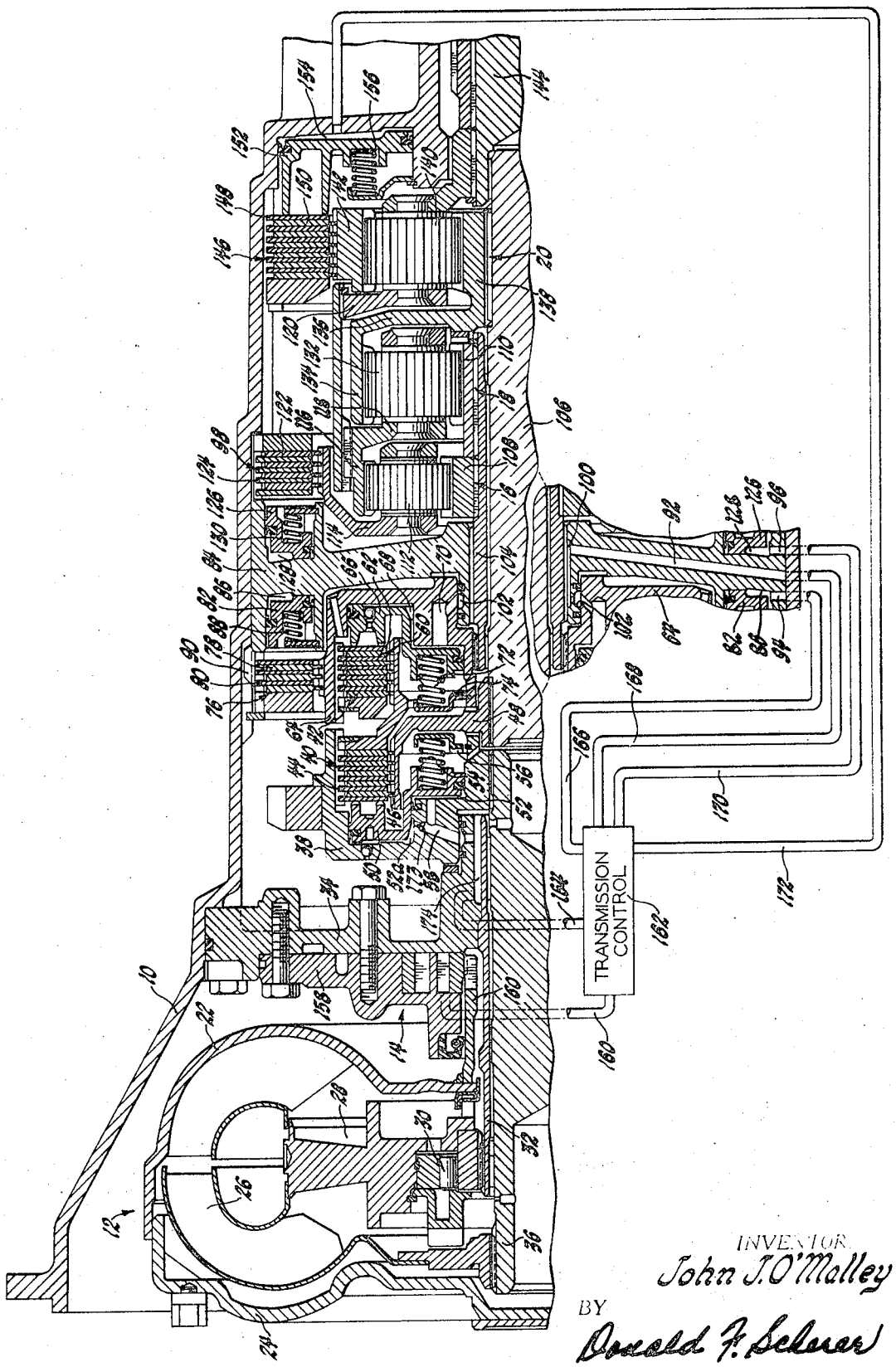
INVENTOR.
John J. O'Malley
BY
Donald F. Scherer
ATTORNEY 3,730,022

POWER TRANSMISSION

SUMMARY OF THE INVENTION

The invention is specifically designed for use in trucks wherein four forward drive ratios are desirable, but may be used in passenger vehicles or power transmitting applications other than vehicles if desired. The invention provides for brake to brake shift of drive ratio in three forward reduction drive ratios with a single brake to clutch shift to establish fourth gear as direct drive. An interconnection between one member of each of the planetary gear sets and the output shaft permits the use of simple planetary reduction ratios in two forward speed ratios and one reverse speed ratio. Interconnections between members of two planetary gear sets permits the use of compounded planetary reduction ratios in one forward and one reverse speed ratio. The use of dual input clutches and the above-mentioned interconnections provides for a one-to-one ratio in all three planetary gear sets when a direct drive is desired.

The planetary gear sets and two disc brakes are located rearward of a central web and two disc clutches and a disc brake are located forwardly of the central web. The central web is nonrotatably connected to the transmission housing and provides support for two fluid motors which are each individually operative to engage a friction brake on either side of the web. A central bore in the web provides circumferential support for a rotatable sleeve shaft which drivingly connects one of the clutches to the sun gears of two of the planetary gear sets. The central web also provides support for a rotatable fluid motor which controls the engagement of the last-mentioned clutch.

It is therefore an object of this invention to provide in an improved transmission having three planetary gear sets each with a member connected to the output shaft for providing four forward speed ratios and a reverse speed ratio.

Another object of this invention is to provide an improved four speed transmission wherein three planetary gear sets are interconnected to provide two simple reduction ratios, one compound reduction ratio and a direct drive ratio.

Another object of this invention is to provide in an improved four speed transmission having three planetary gear sets, a central web member separating the planetary gear sets from the input clutches and providing support for the input drive connections from the clutches to the planetary gear sets.

Another object of this invention is to provide in an improved transmission having three planetary gear sets, three brakes and two clutches, a central web separating two clutches and a brake from the other members and housing apply motors for two of the brakes.

These and other objects and advantages will be apparent to those skilled in the art from the following description and drawings showing a cross-sectional elevation view of the transmission.

DESCRIPTION OF THE DRAWING

Referring to the drawing, there is shown a transmission having a housing 10 which encloses a torque converter 12, a hydraulic pump 14 and three planetary gear sets 16, 18 and 20. The torque converter 12 has an impeller 22 driven by an engine through a plate 24, a turbine 26 and a stator 28 in fluid communication with the impeller and turbine and connected to the transmission housing 10 via a one-way brake 30, a sleeve shaft 32, and a stationary wall 34.

The torque converter 12 is of conventional construction and transmits power from the engine to the transmission gearing. The turbine 26 is splined to a transmission input shaft 36 which is splined to a clutch housing 38. The clutch housing 38 is drivingly connected to two input clutches 40 and 42.

The input clutch 40 includes a plurality of alternately spaced plates 44 and 46 which are splined to the clutch housing 38 and a hub 48 respectively. A piston 50 is slidably mounted in the clutch housing 38 and cooperates therewith to provide a pair of fluid chambers 52 and 52a which, when pressurized, urges the piston 50 into engagement with the clutch plate 44 and 46 thereby applying the clutch 40. The return spring 54 is held in compression between the piston 50 and a spring retainer 56 which is mounted on the housing 38. The return spring 54 moves the piston 50 out of engagement with the clutch plate when the chambers 52 and 52a are not pressurized. A passage 58 in the housing 38 is adapted to supply fluid to the chambers 52 and 52a.

The clutch 42 includes a plurality of alternately spaced plates 60 and 62 which are splined to the clutch housing 38 and to a drum 64 respectively. A piston 66 is slidably mounted in the drum 64 and cooperates therewith to provide a fluid chamber which is adapted to be pressurized to engage the clutch 42. A passage 70 in the drum 64 conveys fluid pressure through the chamber 68. A return spring 72 is compressed between the piston 66 and a spring retainer 74 which is mounted on the drum 64 and functions to move the piston out of engagement when the chamber 68 is not pressurized. A brake 76 is also operatively connected with the drum 54 and includes alternately spaced plates 78 and 80 which are splined respectively to the drum 64 and to a central web 84 which is splined to the transmission housing 10. A piston 82 is slidably mounted in the central web 84 and cooperates therewith to provide a fluid chamber 86 which is adapted to be filled with pressure fluid to engage the brakes 76. A plurality of return springs 88 are provided to maintain the piston out of engagement with the plates 78 and 80 when the brake is disengaged.

The central web 84 is secured to the transmission housing through a spline 90 and has a plurality of fluid passages 92, 94 and 96 which are adaptive to supply pressure to the clutch 42, the brake 76, and another brake 98 respectively. The passage 92 is connected with a recess area 100 at the inner diameter of the web 84 which is in communication with the passage 70 via an annular recess 102. The passage 94 is in communication with the chamber 86 of the brake 76. The web 84 also provides rotational support for an intermediate sleeve shaft 104 which is splined to the drum 64 and for an intermediate shaft 106 which is splined to the hub 48 and rotatably journalled in the sleeve shaft 104.

The sleeve shaft 104 is splined to a pair of sun gears 108 and 110 which are components of the planetary gear sets 16 and 18 respectively. The planetary gear set 16 also includes a plurality of planet pinions 112 which are rotatably mounted in a carrier 114 and mesh with the sun gear 108 and a ring gear 116 which meshes with the planet pinions 112 and is drivingly connected to a carrier 118 of the planetary gear set 18 and a carrier 120 which is a member of the planetary gear set 20. The carrier 114 is operatively connected to the brake 98 which includes the plurality of alternately spaced plates 122 and 124 which are splined to the carrier 114 and the central web 84 respectively. A piston 126 is slidably mounted in the central web 84 and cooperates therewith to provide a fluid chamber 28 which is adapted to be filled with pressure fluid to engage the brake 98. The chamber 128 is in communication with the passage 96. A plurality of return springs 130 are provided to move the piston 126 out of engagement with the brake plates 122–124 to disengage the brake 98 when the chamber 128 is not pressurized.

The planetary sets 18 also include a plurality of pinion gears 132 which are rotatably mounted on the carrier 118 and mesh with the sun gear 110 and a ring gear 134 which meshes with the pinions 132 and is drivingly connected through a hub 136 with a sun gear 138 of the planetary set 20. The ring gear 134 and the sun gear 138 are splined to the intermediate shaft 106 which is connected to the input clutch 40.

The planetary set 20 also includes a plurality of pinion gears 140 which are rotatably mounted on the carrier 120 and mesh with the sun gear 138 and a ring gear 142. The carrier 120, the carrier 118 and the ring gear 116 are drivingly connected to the transmission output shaft 144. The ring gear 142 is operatively connected to a brake 146 which includes a plurality of alternately spaced plates 148 and 150 which are splined to the transmission housing 10 and the ring gear 142 respectively. A piston 152 is slidably disposed in the transmission housing 10 and cooperates therewith to provide an apply chamber 154 which is adapted to be filled with pressure fluid to move the piston 152 into engagement with the plates 148–150 thereby applying the brake 146. A plurality of return springs 156 are provided to move the piston 152 out of engagement with the brake plates when the chamber 154 is not pressurized.

The clutches and brakes described above are actuated by fluid pressure supplied by the pump 14 which is a conventional internal-external type gear pump and is located in a pump housing 158 which is secured to the wall 34 and is driven by sleeve shaft 160 which is secured to the converter impeller 22. The pump 14, when driven, supplies fluid pressure via a passage 160 to a transmission control 162 which distributes control fluid via passages 164, 166, 168, 170 and 172 to the various clutches and brakes of the transmission. The transmission control may be of the conventional type, that is, it includes a plurality of conventional hydraulic regulator valves and shift valves to control the operation of the transmission. The passage 164 is connected to a recess portion 174 in the wall 34, which, in turn, is in communication with the passage 58 to provide fluid pressure for the piston 50 which controls the engagement of clutch 40. The passage 58 has a restriction 173 which controls the apply fluid flow to chamber 52a and thereby controls the apply rate and force of piston 50. The passage 168 is in communication with the passage 92 which, as described above, provides fluid pressure for the engagement of clutch 42. The passages 166 and 170 are connected to passages 94 and 96 respectively which control the engagement of the brakes 76 and 98 respectively. The passage 172 is connected to the chamber 154 of brake 146 and thereby controls the engagement thereof.

The clutch 40, when engaged, provides a drive connection from the torque converter 12 to the sun gear 138 and ring gear 134. The clutch 42, when engaged, provides a drive connection from the torque converter 12 to the sun gears 108 and 110. The brake 76, when engaged, restrains the sun gears 108 and 110 from rotation to thereby establish sun gear 110 as a reaction member. Brake 98 restrains carrier 114 from rotation and thereby establishes the carrier as a reaction member. The brake 146 restrains the ring gear 142 from rotation and thereby establishes the ring gear as a reaction member. To provide first gear drive forward, the clutch 40 and the brake 146 are engaged thus providing a simple planetary reduction in the planetary gear set 20.

To establish second gear forward, the brake 146 is disengaged while the brake 98 is engaged and the clutch 40 remains engaged to provide a compound reduction drive in planetary gear sets 18 and 16 between the input shaft 34 and the output shaft 144. In second gear forward, the ring gear 134 is the input member for the planetary gearing and ring gear 116 and carrier 118 are output members. The planetary set 20 merely idles and carries no load.

To establish third gear forward, the brake 98 is disengaged while the brake 76 is engaged and the clutch 40 remains engaged thus providing a simple planetary reduction in planetary gear sets 18 between the input shaft 34 and the output shaft 144. The ring gear 134 is also the input member in third gear forward and the carrier 118 is the output member.

To establish fourth gear forward, the brake 76 is disengaged while the brake 42 is engaged and the clutch 40 remains engaged. With both clutches 40 and 42 engaged, the planetary sets 16, 18 and 20 are in a lockup or one-to-one condition thus providing a direct drive from the input shaft 34 to the output shaft 144.

To establish one reverse ratio, the clutch 42 is engaged and the brake 146 is engaged. This provides a compound reverse reduction ratio in planetary gear sets 18 and 20 between the input shaft 34 and the output shaft 144. In this reverse drive, the sun gear 110 is the input member and the carrier 120 is the output member for the planetary gear sets.

To establish another reverse ratio, the brake 146 is disengaged while the brake 98 is engaged and the clutch 42 remains engaged. This establishes a simple planetary reverse reduction drive in planetary gear set 16 between the input shaft 34 and the output shaft 144. In this drive, the sun gear 108 is the input member and the ring gear 116 is the output member of the planetary gear set.

During low forward ratio, the rear gear set 20 transmits all of the engine torque at a high ratio to the output shaft 144. Therefore, this gear set is designed for high torque capacity. During second ratio forward, the drive torque is shared by the planetary gear sets 16 and 18 thereby permitting the gear sets 16 and 18 to be designed for lighter torque loads. Also, when the ring gear 134 is used as the input member, the gear loading is reduced. During third and fourth ratios, the torque is transmitted by the gear set 18, however, the torque ratio is small during these drives to permit the use of a low capacity gear set.

The two reverse drives are designed to have a low step ratio, such as 1.90, between them. This permits the use of a shift from first reverse to second reverse during operation.

It should be understood that the above description is not intended as being a limitation since obvious modifications will occur to those skilled in the art.

What is claimed is:

1. In a transmission, first, second and third gear units, each unit including a planet carrier supporting a planet pinion in mesh with a sun gear and a ring gear, respectively, a final power delivery shaft, the ring gear of said first gear unit and the planet carriers of said second and third gear units being fixed to each other and to said final power delivery shaft for rotation as a unit, the ring gear of said second gear unit being connected to the sun gear of said third gear unit for rotation therewith as a unit, means connecting the sun gear of said first and second gear units to each other for rotation as a unit, an engine driven power input shaft, a shaft intermediate said power input and final power delivery shafts rotatable as a unit with said third gear unit sun gear and second gear unit ring gear, an engageable and releasable clutch between said engine driven shaft and said intermediate shaft, a second clutch effective when engaged to connect said engine driven power input shaft to said first and second unit sun gears, a first brake for braking said third gear unit ring gear against rotation, a second brake for braking said first gear unit carrier against rotation, a third brake for braking said first and second gear unit sun gears against rotation, said first clutch and third gear unit brake being engaged to establish first gear drive, said first clutch and said first gear unit planet carrier brake being engaged to establish second gear drive, said first clutch and said first and second gear unit sun gear brake being engaged to establish third gear drive, and said first and second clutches being engaged to establish direct drive.

2. The invention defined in claim 1 and said transmission including a stationary central web member disposed between said engine driven power input shaft and said final power delivery shaft and rotatably supporting said intermediate shaft, said central web forming forward and rearward locations housing said first clutch, said second clutch and said third brake and said gear units, said first brake and said second brake respectively; and said central web providing support for said second and third brakes.

3. The invention defined in claim 2 and said second and third brakes being fluid operated and including apply piston means for engaging said brakes, said second clutch being fluid operated, and said central web member including a pair of chambers for slidably supporting both said apply piston means, and first, second and third fluid passage means for supplying fluid to said second brake, third brake, and said second clutch respectively.

4. In a transmission, a housing, an input shaft rotatably mounted in the housing; an output shaft rotatably mounted in the housing; a central web secured to said housing between said input and output shafts; first brake means operatively connected with said central web on the output shaft side of said web; second brake means operatively connected with said housing on the output shaft side of said web; third brake means operatively connected with said web on said input shaft side thereof; first and second clutch means operatively connected to said input shaft on the input shaft side of said web; first, second and third planetary gear means on said output shaft side of said web, one member of each of said planetary gear sets being drivingly connected to said output shaft, a member of said third planetary gear means being operatively connected with said second brake means, a member of said first planetary gear means being operatively connected with said first brake means, a member of each of said second and third planetary gear means being operatively connected with said first clutch means and a member of each of said first and second planetary gear means being operatively connected with said second clutch means and said third brake means; said clutch means and said brake means being selectively engageable to provide a simple reduction ratio in each of said second and third planetary gear means, a compound reduction in said second and third planetary gear means, a compound reduction ratio in said first and second planetary gear means, and a one-to-one ratio in all of said planetary gear means.

5. The invention defined in claim 4 and said clutch means and said brake means each having fluid operated piston means for applying said clutch and brake means; and said central web including passage means for communicating fluid pressure to said piston means of said second clutch means and said first and third brake means individually.

6. In a transmission a housing; an input shaft rotatably supported in said housing; an output shaft rotatably supported in said housing; a central web secured to said housing intermediate said input and output shafts; planetary gear means disposed between said central web and said output shaft for establishing drive ratios including first, second and third planetary gear sets each having a first member, a second member, and a third member, said first member of each of said planetary gear sets being secured for rotation with said output shaft, said second member of said first and second planetary gear sets being interconnected for common rotation, said third member of said second planetary gear set and said second member of said third planetary gear set being interconnected for common rotation; first brake means operatively connected with said third member of said first planetary gear set and having a portion housed in said central web and being selectively engageable for restraining rotation of the third member; second brake means having a portion housed in said housing being selectively operatively connected with said third member of said third planetary gear set, an intermediate sleeve shaft rotatably supported in and extending through said central web and being secured for rotation with said interconnected second members; an intermediate shaft rotatably supported in and extending through said intermediate sleeve shaft and being secured for rotation with said interconnected second and third members; third brake means having a portion housed in said central web and being selectively operatively connectable with said intermediate sleeve shaft for restraining rotation thereof; first clutch means selectively operatively connectable between said input shaft and said intermediate shaft; and second clutch means selectively operatively connectable between said input shaft and said intermediate sleeve shaft, whereby selective operation of said clutch and brake means provides a plurality of drive ratios between said input and output shafts.

7. In a power transmission the combination of a drive shaft, a first planetary gear group having plural input members, plural output members and plural reaction members, a second planetary gear group having an input member, an output member and another member, a driven shaft drive connected to said output member of said second planetary gear group, a first means for interconnecting one input member of said first planetary gear group and the input member of the second planetary gear group, a second means for connecting at least two output members of said first planetary gear group with said output member of said second planetary gear group, a first driving means for selectively operably connecting said drive shaft to said first means, a second driving means for selectively operatively connecting said drive shaft to two input members of said first planetary gear group, a first holding means for selectively holding one reaction member of said first planetary gear group from rotation, a second holding means for selectively holding said another member of said second planetary gear group from rotation and a third holding means for selectively holding another reaction member of said first planetary gear group from rotation.

8. In a power transmission the combination of a drive shaft, a first planetary gear group having a first and second sun gear, a first and second ring gear, a first carrier having a plurality of pinions meshing with said first sun and first ring gears and a second carrier having a plurality of pinions meshing with said second sun and second ring gears, said first and second sun gears being rigidly connected, said first carrier and said second ring gear being drive connected, a second planetary gear group having a sun gear, a ring gear and a carrier having a plurality of pinions rotatably mounted thereon meshing with said sun and ring gears, said sun gear being drive connected to said first ring gear of said first planetary gear group, said carrier of said second planetary gear group being connected to said first carrier and said second ring gear of said first planetary gear group, a driven shaft connected to said carrier of said second planetary gear group, a first clutch means for selectively connecting said drive shaft to said sun gear of said second planetary gear group and said first ring gear of said first planetary gear group, a second clutch means for selectively connecting said drive shaft to said first and second sun gears of said first planetary gear group, a first brake means selectively operatively connected to said ring gear of said second planetary gear group, a second brake means selectively operatively connected to said second carrier of said first planetary gear group and a third brake means selectively operatively connected to said first and second sun gears of said first planetary gear group.

* * * * *